United States Patent
Yeh et al.

(10) Patent No.: US 8,270,837 B2
(45) Date of Patent: Sep. 18, 2012

(54) OPTICAL POWER EQUALIZER FOR PASSIVE OPTICAL NETWORK

(75) Inventors: Chien-Hung Yeh, Hsinchu County (TW); Dar-Zu Hsu, Tainan County (TW); Sien Chi, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1050 days.

(21) Appl. No.: 11/563,790

(22) Filed: Nov. 28, 2006

(65) Prior Publication Data

US 2008/0124082 A1   May 29, 2008

(51) Int. Cl.
*H04J 14/08* (2006.01)
*H04B 10/00* (2006.01)

(52) U.S. Cl. ............ 398/98; 398/173; 398/175; 398/180

(58) Field of Classification Search ............ 398/98–102, 398/173, 175, 178, 180
See application file for complete search history.

(56) References Cited

U.S. PATENT DOCUMENTS

| | | | |
|---|---|---|---|
| 6,118,565 A * | 9/2000 | Frigo ................ | 398/68 |
| 7,177,330 B2 | 2/2007 | Wai et al. | |
| 7,254,332 B2 * | 8/2007 | Song et al. ........ | 398/72 |
| 2004/0247246 A1 * | 12/2004 | Lee et al. ........... | 385/48 |
| 2005/0152696 A1 * | 7/2005 | Shin et al. ........ | 398/71 |
| 2006/0039700 A1 * | 2/2006 | Kim et al. ......... | 398/72 |

OTHER PUBLICATIONS

L.Y. Chan et al., "Simultaneous Repolarization of Two 10-Gb/s Polarization-Scrambled Wavelength Channels Using a Mutual-Injection-Locked Laser Diode," Dec. 2002, IEEE Photonics Technology Letters, vol. 14, No. 12, pp. 1740-1742.*

H. Kawaguchi, "Multiple Bistability and Multistability in a Fabry-Perot Laser Diode Amplifier", Sep. 1987, IEEE Journal of Quantum Electronics, vol. QE-23, No. 9, pp. 1429-1433.*

Office Action for Taiwan Application No. 09920349120 dated May 25, 2010.

Chan, L.Y. et al., *Simultaneous Repolarization of Two 10-Gb/s Polarization-Scrambled Wavelength Channels Using a Multi-Injection-Locked Laser Diode*, IEEE Photonics Technology Letters, vol. 14, No. 12, Dec. 2002, pp. 1740-1742.

Chung, W. H. et al., *Output Polarization Control of Fiber DFB Laser Using Injection Locking*, IEEE Photonics Technology Letters, vol. 14, No. 7, Jul. 2002, pp. 920-922.

T. Hurvitz et al., "Variable Optical Attenuator Based on Ion-Exchange Technology in Glass", Journal of Lightwave Technology, vol. 23, No. 5, pp. 1918-1922, (2005).

Sean M. Garner et al., "Variable Optical Attenuator for Large-Scale Integration", IEEE Photonics Technology Letters, vol. 14, No. 11, pp. 1560-1562, (2002).

* cited by examiner

*Primary Examiner* — Kenneth N Vanderpuye
*Assistant Examiner* — Daniel Dobson
(74) *Attorney, Agent, or Firm* — Alston & Bird LLP

(57) ABSTRACT

A device capable of equalizing optical powers of optical signals in a passive optical network, the device comprising a first optical coupler for receiving optical signals having different optical power levels, an optical circulator capable of directing the optical signals from the first optical circulator, a laser diode capable of generating equalized optical signals having a predetermined range of optical power levels in response to the optical signals directed from the optical circulator, and a second optical coupler for receiving the equalized optical signals.

23 Claims, 11 Drawing Sheets

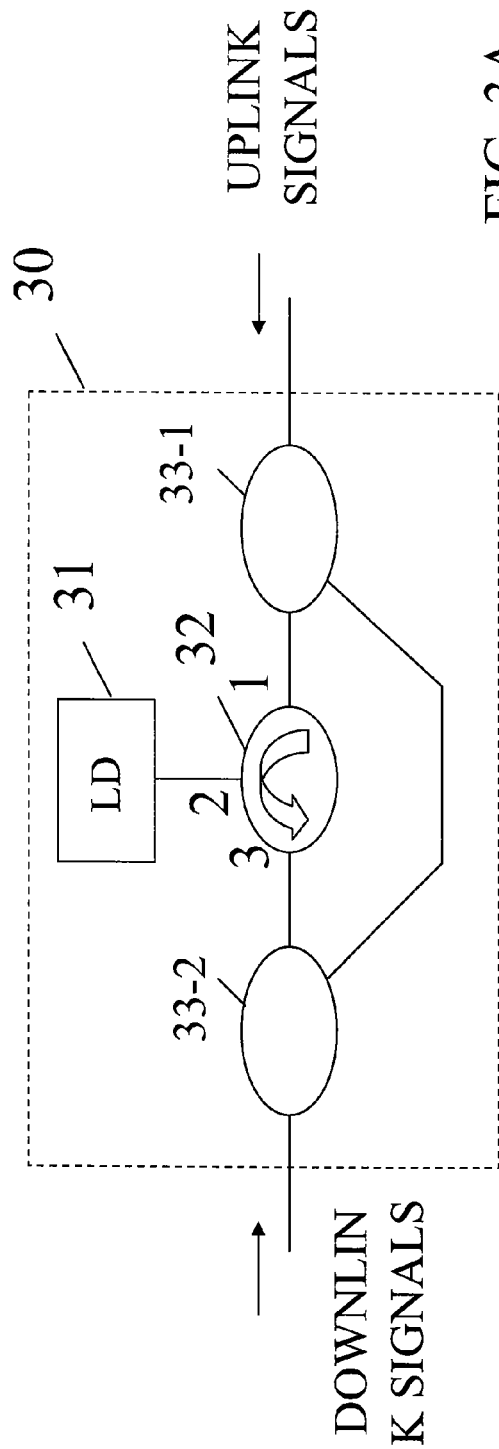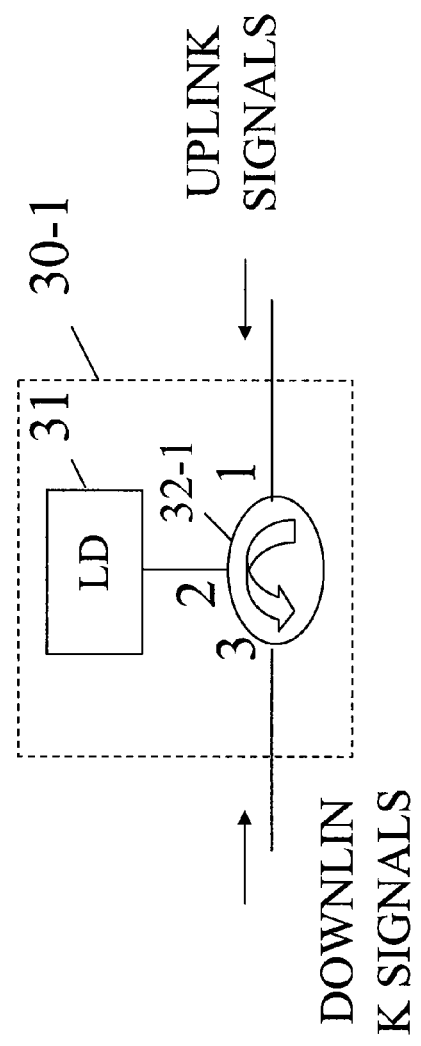
FIG. 3A
FIG. 3B

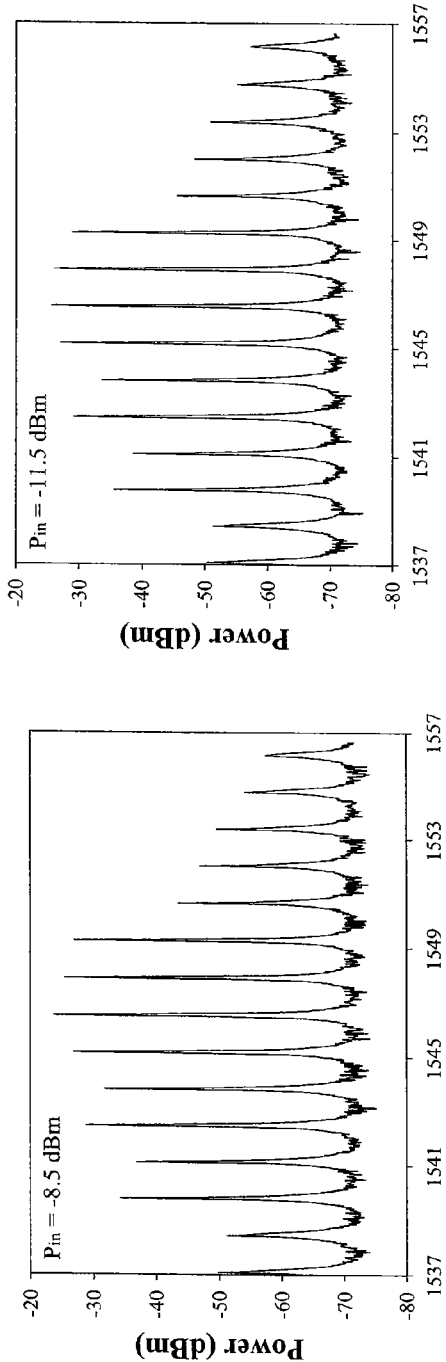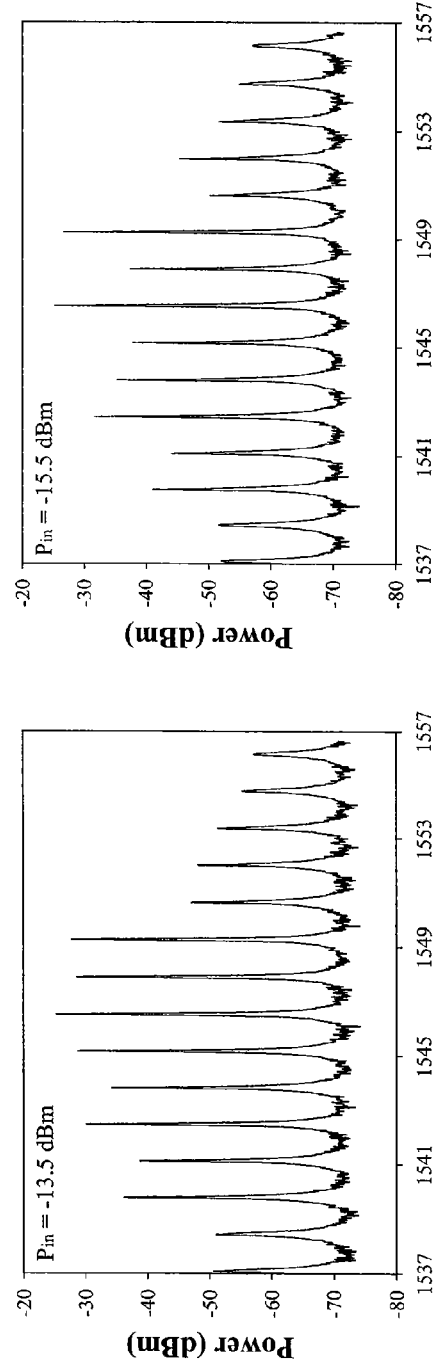
FIG. 6A  FIG. 6B  FIG. 6C  FIG. 6D

OPTICAL POWER EQUALIZER FOR PASSIVE OPTICAL NETWORK

BACKGROUND OF THE INVENTION

The present invention relates generally to optical transmission and, more particularly, to an optical power equalizer capable of equalizing the optical power of optical signals in a passive optical network.

The increasing demand for faster and higher capacity information processing and transmission has accelerated the development and research in optical fiber networks and systems. Information may be transported through optical systems in audio, video, data, or other signal formats analogous to electrical systems. Furthermore, optical systems may be used in telephone, cable television, local area network ("LAN") and wide area network ("WAN") systems as well as other communication systems. Optical systems may also offer various communication services such as voice over internet protocol ("VoIP") and internet protocol television ("IPTV") services in a fiber-to-the-X ("FTTX") architecture, including fiber-to-the-home ("FTTH"), fiber-to-the-premise ("FTTP"), fiber-to-the-curb ("FTTC") or the like.

A passive optical network ("PON") is one of optical network systems used for the FTTX architecture for introducing optical communications. FIG. 1 is a block diagram of a conventional PON 10. Referring to FIG. 1, the PON 10 includes an optical line termination ("OLT") 11, an optical splitter 12 and a plurality of optical network units ("ONUs") 13-1 to 13-N. Each of the ONUs 13-1 to 13-N transmits optical signals upstream to the OLT 11 through the optical splitter 12. However, since the distance between the OLT 11 and the ONUs 13-1 to 13-N may be different from each other, optical signals 14-1 to 14-N may reach the OLT 11 with different optical powers due to, for example, signal path attenuation. The different power levels may disadvantageously result in an incorrect detection of the optical signals at the OLT 11. Generally, a burst mode receiver (not shown) may be provided in the OLT 11 to equalize the optical powers of the optical signals. The burst mode receiver is required to detect a relatively wide range of powers, for example, 21 dB to 24 dB, and support dynamic adjustment of decision threshold values, which may complicate the OLT structure and reduce the bandwidth efficiency.

It may be therefore desirable to have an optical power equalizer that is able to equalize the optical power of optical signals in a passive optical network. It may be also desirable to have an optical power equalizer that is able to cost-efficiently equalize optical signals at an OLT side.

BRIEF SUMMARY OF THE INVENTION

Examples of the invention may provide a device capable of equalizing optical powers of optical signals in a passive optical network, the device comprising a first optical coupler for receiving optical signals having different optical power levels, an optical circulator capable of directing the optical signals from the first optical circulator, a laser diode capable of generating equalized optical signals having a predetermined range of optical power levels in response to the optical signals directed from the optical circulator, and a second optical coupler for receiving the equalized optical signals.

Examples of the invention may also provide a device capable of equalizing optical powers of optical signals in a passive optical network, the device comprising a laser diode capable of generating equalized optical signals having a predetermined range of optical power levels in response to optical signals having a first wavelength, and an optical circulator capable of directing the optical signals having a first wavelength to the laser diode and bypassing optical signals having a second wavelength different from the first wavelength.

Some examples of the invention may also provide a device capable of equalizing optical powers of optical signals in a passive optical network, the device comprising a multiplexer/demultiplexer, a laser diode capable of generating equalized optical signals having a predetermined range of optical power levels in response to optical signals having a first wavelength from the multiplexer/demultiplexer, and an optical circulator capable of directing the optical signals having the first wavelength to the laser diode.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples consistent with the invention. It should be understood, however, that the invention is not limited to the precise arrangements and instrumentalities shown.

In the drawings:

FIG. 3A is a schematic diagram of an optical power equalizer ("OPE") consistent with an example of the present invention;

FIG. 3B is a schematic diagram of an OPE consistent with another example of the present invention;

FIGS. 6A to 6D are diagrams illustrating output spectrums at different input power levels;

DETAILED DESCRIPTION OF THE INVENTION

Reference will now be made in detail to the present embodiments of the invention, examples of which are illustrated in the accompanying drawings. Wherever possible, the same reference numbers will be used throughout the drawings to refer to the same or like portions.

Figure 1:
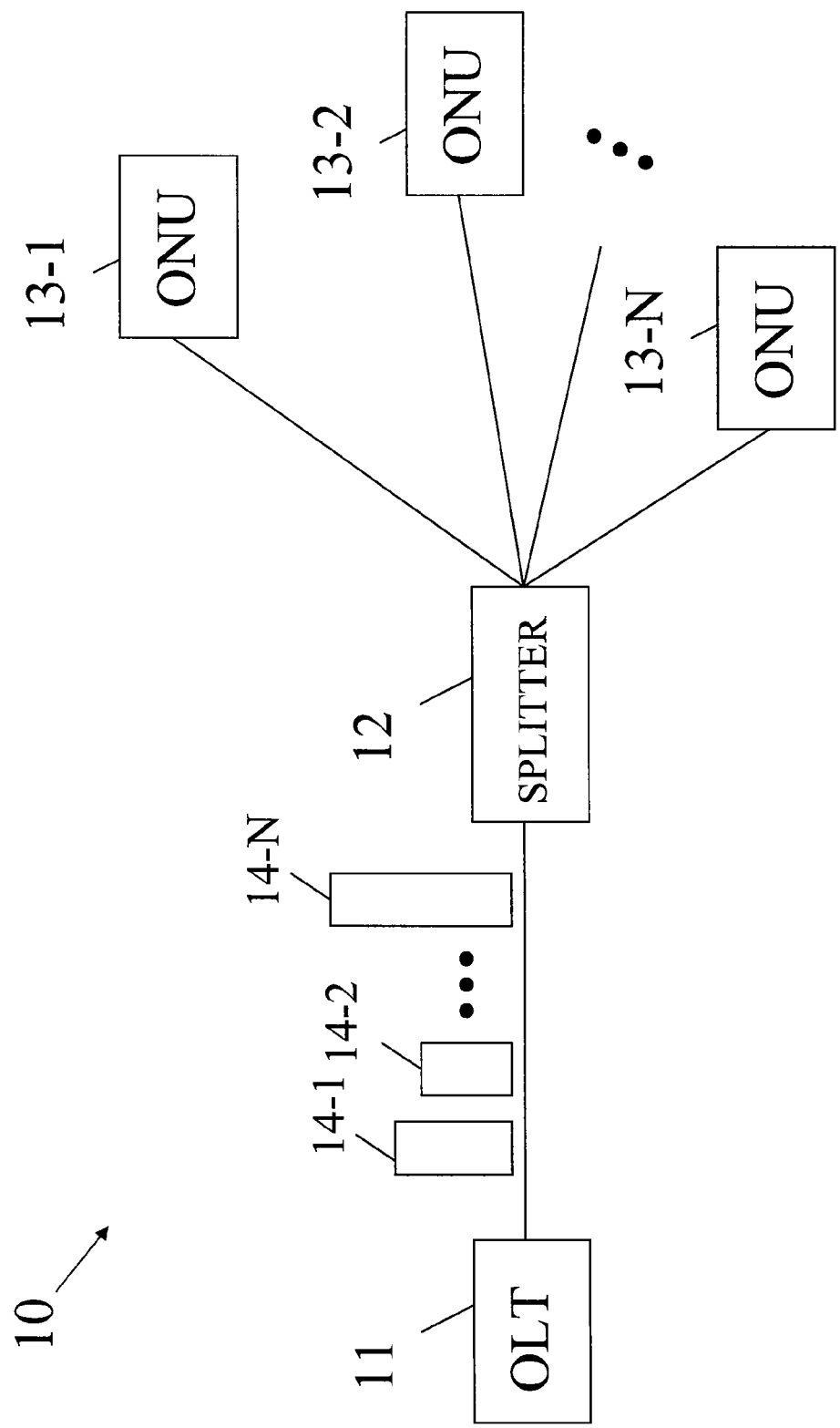
FIG. 1 is a block diagram of a conventional passive optical network ("PON")
Figure 2:
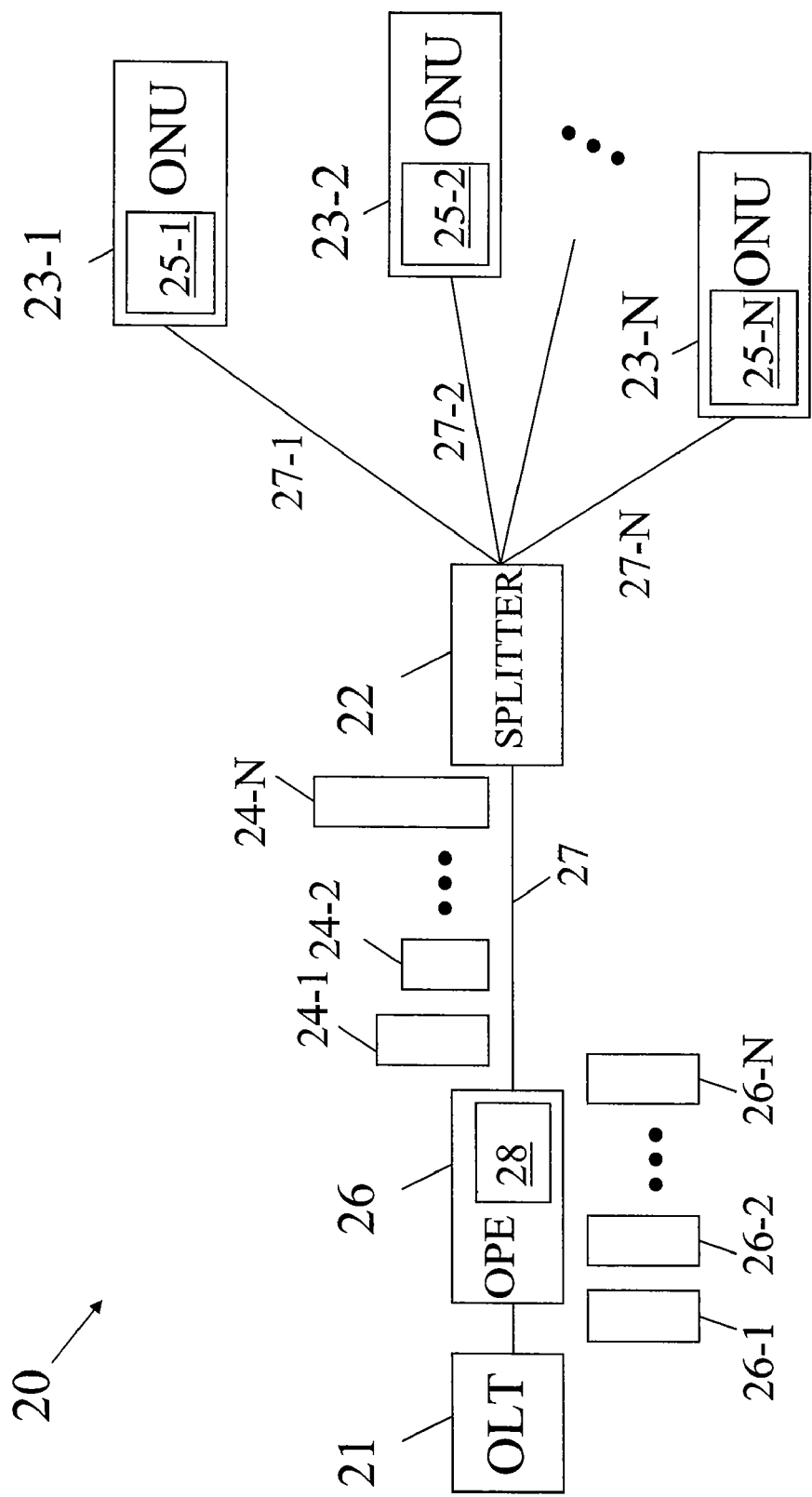
FIG. 2 is a schematic diagram of a passive optical network consistent with an example of the present invention.

FIG. 2 is a schematic diagram of a passive optical network ("PON") 20 consistent with an example of the present invention. Referring to FIG. 2, the PON 20 includes an optical line termination ("OLT") 21, an optical splitter 22, a plurality of optical network units ("ONUs") 23-1 to 23-N and an optical power equalizer ("OPE") 26. In the present example, the OPE 26 is separate from the OLT 21. In other examples, however, the OPE 26 is incorporated in the OLT 21. The optical splitter 22, located between the OLT 21 and the ONUs 23-1 to 23-N, is connected to the OLT 21 through an optical path 27 and connected to the ONUs 23-1 to 23-N through optical paths 27-1 to 27-N. Each of the ONUs 23-1 to 23-N transmits uplink optical signals to the OLT 11 through the optical splitter 22. The optical signals 24-1 to 24-N may exhibit different power levels due to different distances between the OLT 21 and the ONUs 23-1 to 23-N. The OPE 26 equalizes the optical signals 24-1 to 24-N having different power levels to provide optical signals 26-1 to 26-N with substantially the same power level.

The plurality or ONUs 23-1 to 23-N include transceivers 25-1 to 25-N, respectively, for transmitting uplink signals to the OLT 21 or receiving downlink signals from the OLT 21. The OPE 26 includes a laser diode 28 capable of equalizing uplink optical signals. Each of the transceivers 25-1 to 25-N and the laser diode 28 includes substantially the same laser diode. In one example consistent with the present invention, each of the transceivers 25-1 to 25-N and the laser diode 28 includes a Fabry-Perot laser diode ("FP-LD"). Furthermore, distinct wavebands are used in the PON 20 for transmitting optical signals. In one example, uplink data are transmitted in a 1310 nanometer (nm) band, downlink data are transmitted in a 1490 nm band, and image data are transmitted in a 1550 nm band.

FIG. 3A is a schematic diagram of an optical power equalizer ("OPE") 30 consistent with an example of the present invention. Referring to FIG. 3A, the OPE 30 includes a laser diode 31, an optical circulator 32, a first optical coupler 33-1 and a second optical coupler 33-2. In an uplink transmission, the first optical coupler 33-1 receives uplink signals having a first wavelength sent from transceivers of optical network units ("ONUs"), and directs the uplink signals to the optical circulator 32, which in turn directs the uplink signals to the laser diode 31. The laser diode 31, which is substantially the same as those included in the transceivers, equalizes the uplink signals in power level and provides equalized uplink signals to the optical circulator 32. The second optical coupler 33-2 receives the equalized uplink signals from the optical circulator 32 and sends the same to the OLT. In a downlink transmission, the second optical coupler 33-2 receives downlink signals having a second wavelength from the OLT and sends the downlink signals to the first optical coupler 33-1, bypassing the optical circulator 32. In one example consistent with the present invention, the laser diode 31 includes an FP-LD. Each of the first optical coupler 33-1 and the second optical coupler 33-2 includes a wavelength division multiplexed ("WDM") coupler. Furthermore, the first wavelength and the second wavelength are 1310 nm and 1490 nm, respectively.

FIG. 3B is a schematic diagram of an OPE 30-1 consistent with another example of the present invention. Referring to FIG. 3B, the OPE 30-1 includes a laser diode 31 and an optical circulator 32-1. The optical circulator 32-1 is capable of band selection, thereby eliminating the first and second optical coupler 33-1 and 33-2 illustrated in FIG. 3A. Specifically, in an uplink transmission, the optical circulator 32-1 directs uplink signals having a first wavelength at a first port labeled "1" to the laser diode 31, receives equalized uplink signals from the laser diode 31 at a second port labeled "2", and provides the equalized uplink signals to an OLT at a third port labeled "3". In a downlink transmission, the optical circulator 32-1 directs downlink signals having a second wavelength at the third port "3" to the first port "1", bypassing the laser diode 31.

Figure 4A:
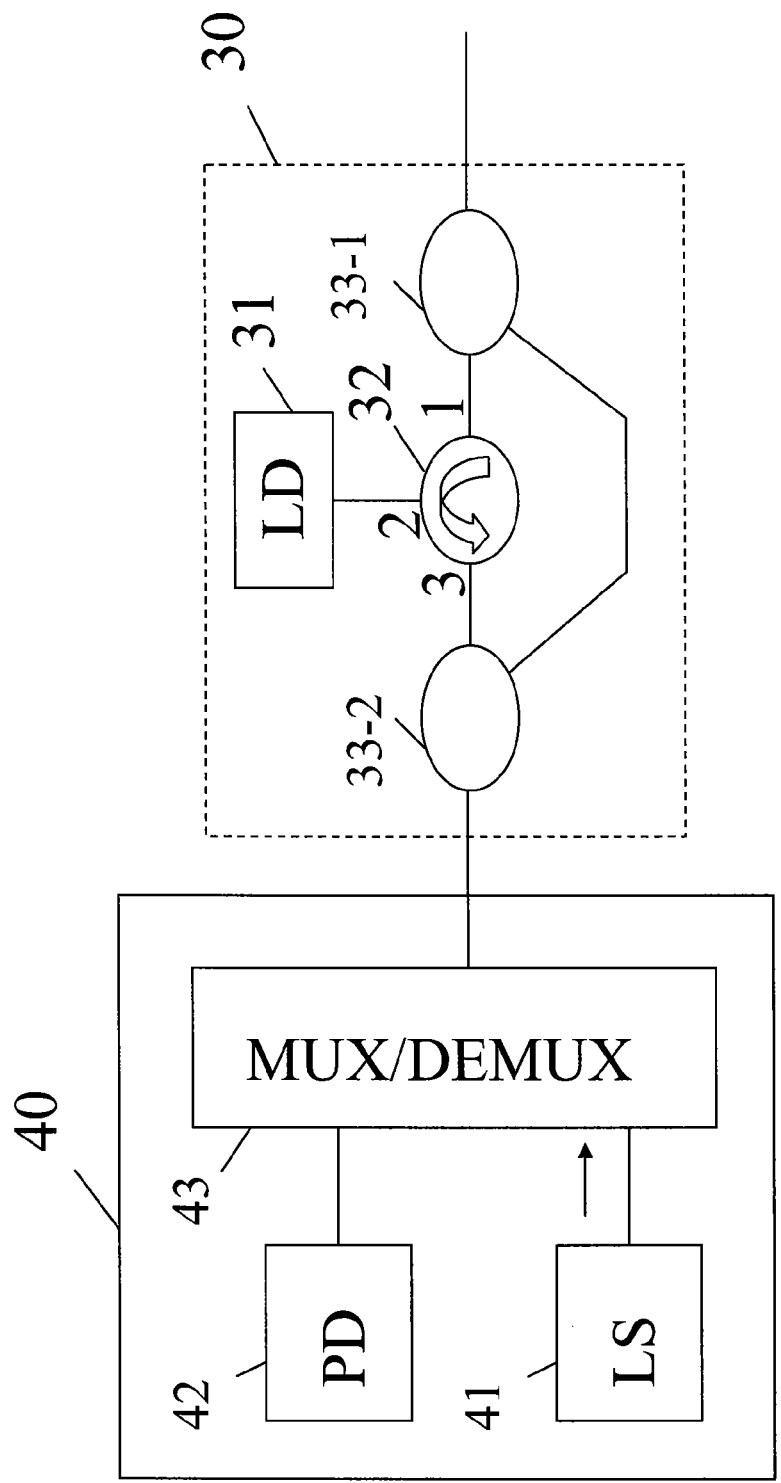
FIG. 4A is a schematic diagram of an optical line termination ("OLT") and the OPE illustrated in FIG. 3A.

FIG. 4A is a schematic diagram of an optical line termination ("OLT") 40 and the OPE illustrated 30 in FIG. 3A. Referring to FIG. 4A, the OLT 40 includes a light source (LS) 41, a photodetector (PD) 42 and a multiplexer/demultiplexer (MUX/DEMUX) 43. The light source 41, for example, a laser diode, generates downlink optical signals to be transmitted to ONUs. The MUX/DEMUX 43 multiplexes the downlink optical signals for the downstream transmission, and demultiplexes equalized uplink optical signals sent from the second optical coupler 33-2. The photodetector 42 detects the demultiplexed equalized uplink optical signals. In one example consistent with the present invention, the MUX/DEMUX 43 includes a WDM coupler.

Figure 4B:
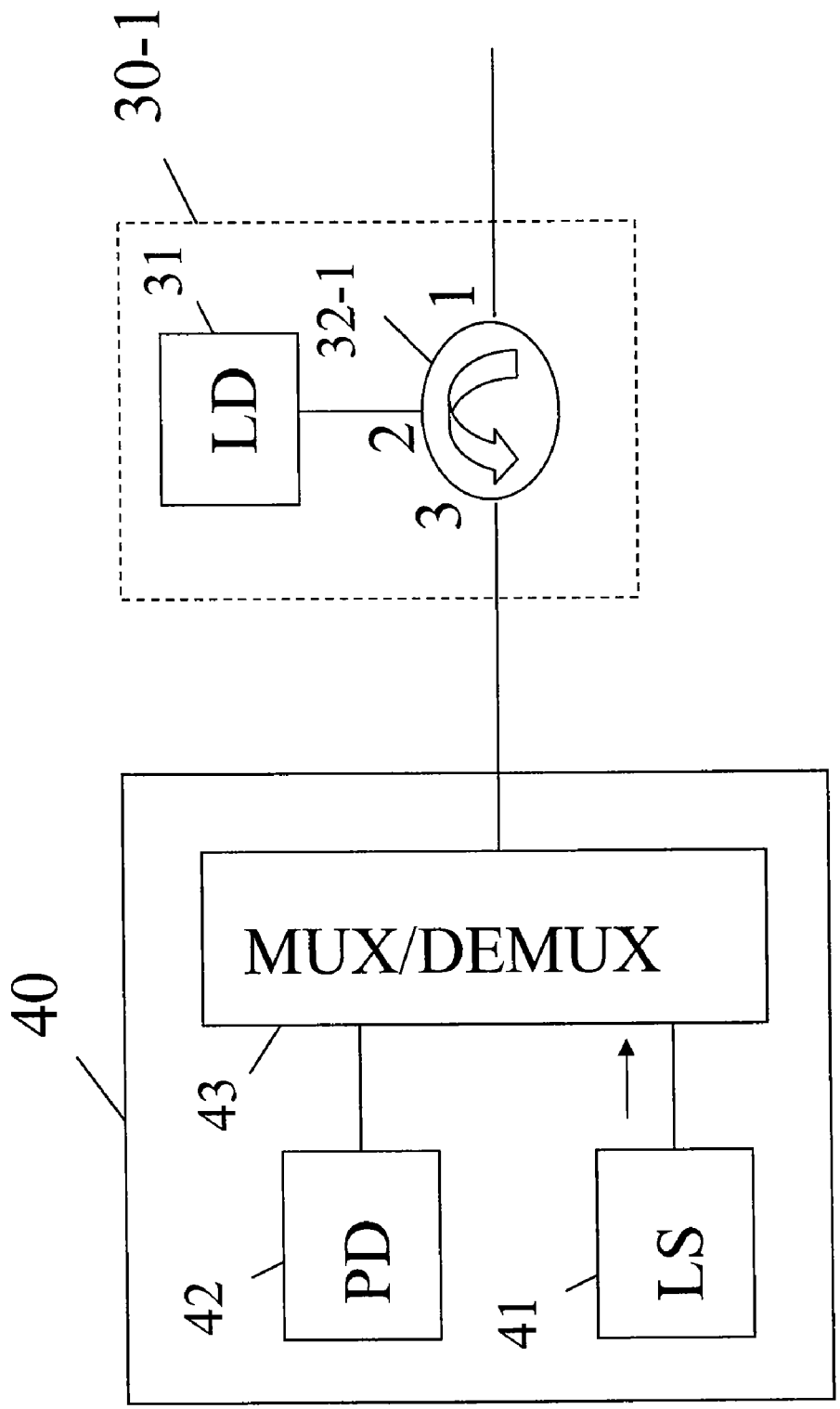
FIG. 4B is a schematic diagram of an OLT and the OPE illustrated in FIG. 3B.

FIG. 4B is a schematic diagram of an OLT 40 and the OPE 30-1 illustrated in FIG. 3B. Referring to FIG. 4B, the optical circulator 32-1 directs multiplexed downlink optical signals sent from the MUX/DEMUX 43 to the first port "1", bypassing the laser diode 31 in a downlink transmission. In an uplink transmission, the optical circulator 32-1 directs uplink optical signals at the first port "1" to the laser diode 31, receives equalized uplink optical signals from the laser diode 31 at the second port "2", and provides the equalized uplink optical signals to the MUX/DEMUX 43 at the third port "3".

Figure 4C:
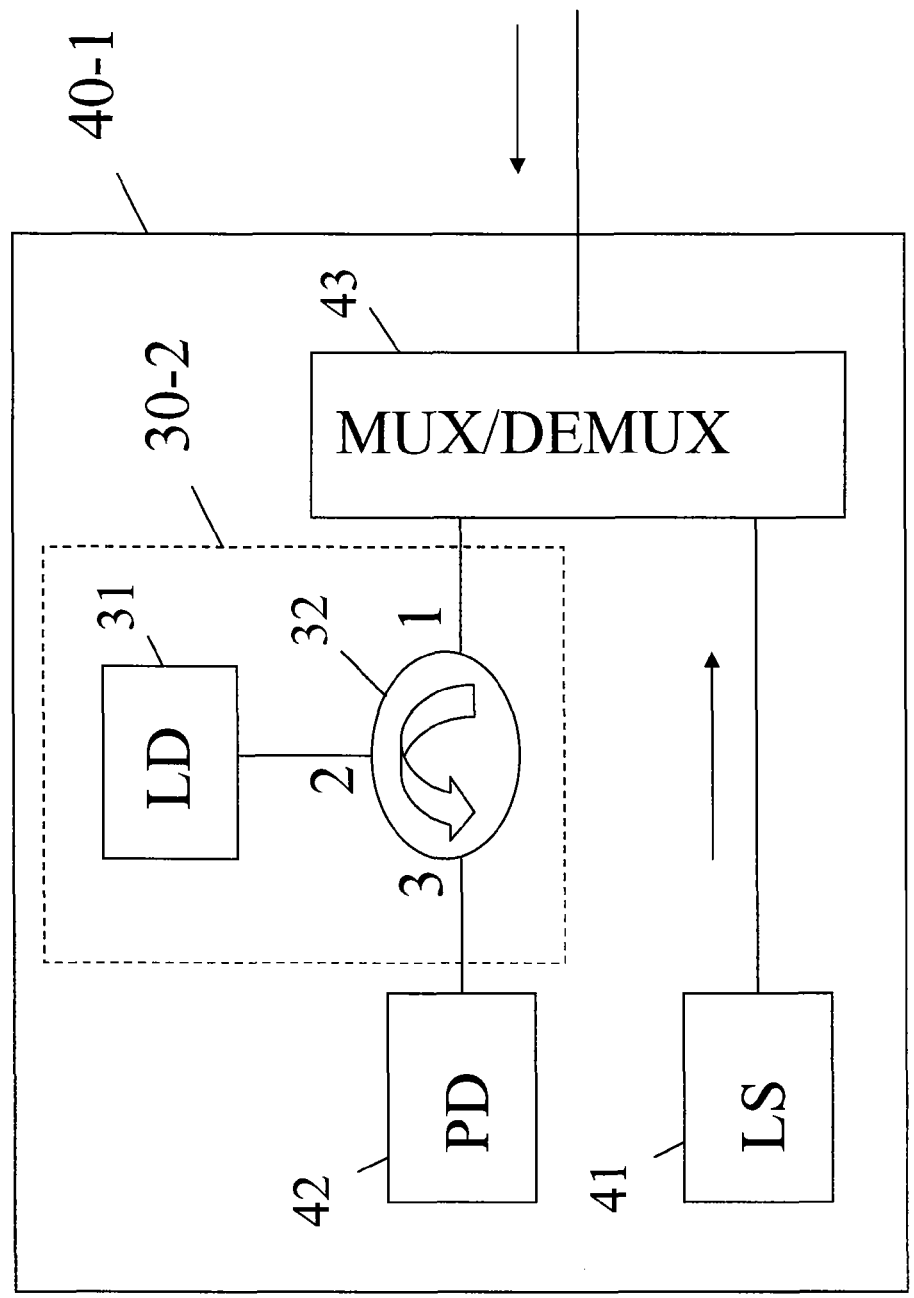
FIG. 4C is a schematic diagram of an OPE incorporated in an OLT consistent with an example of the present invention.

FIG. 4C is a schematic diagram of an OPE 40-1 incorporated in an OLT 30-2 consistent with an example of the present invention. Referring to FIG. 4C, the optical circulator 32 of the OPE 40-1 is connected to the MUX/DEMUX 43 at the first port "1", and connected to the photodetector 42 at the third port "3". In an uplink transmission, the optical circulator 32 directs demultiplexed uplink optical signals sent from MUX/DEMUX 43 at the first port "1" to the laser diode 31, receives equalized uplink optical signals at the second port "2", and sends the equalized uplink optical signals to the photodetector 42.

Figure 5A:
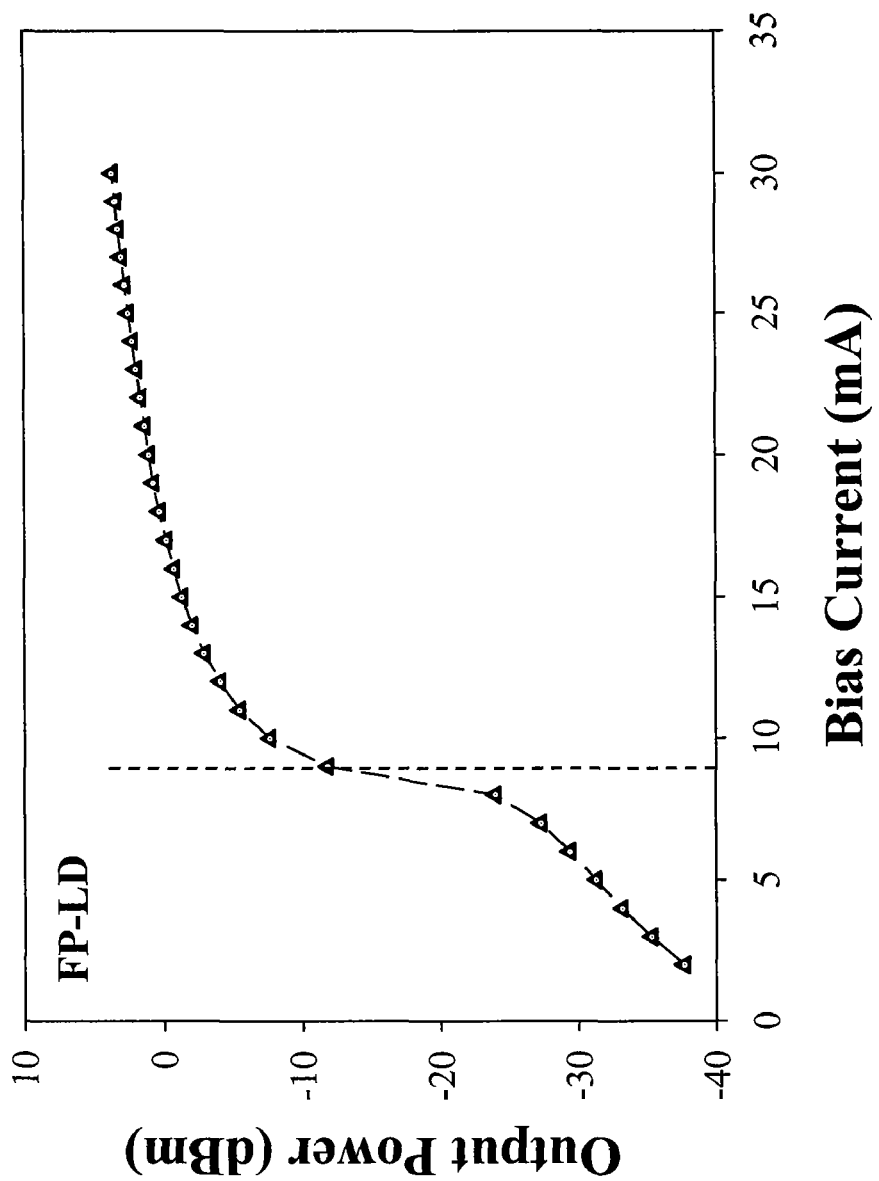
FIGS. 5A and 5B are characteristic diagrams of a Fabry-Perot laser diode.
Figure 5B:
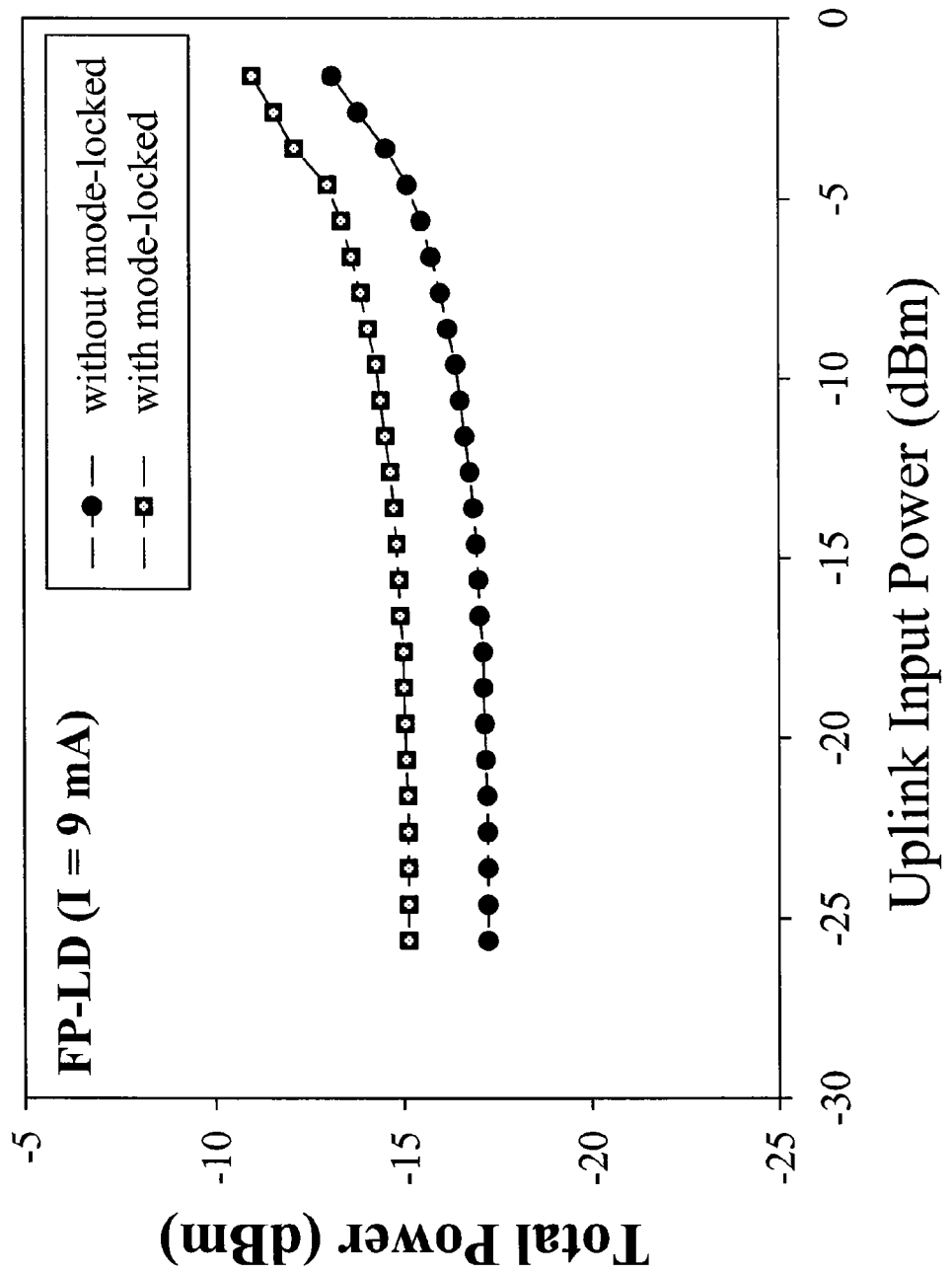
Figure 7B:
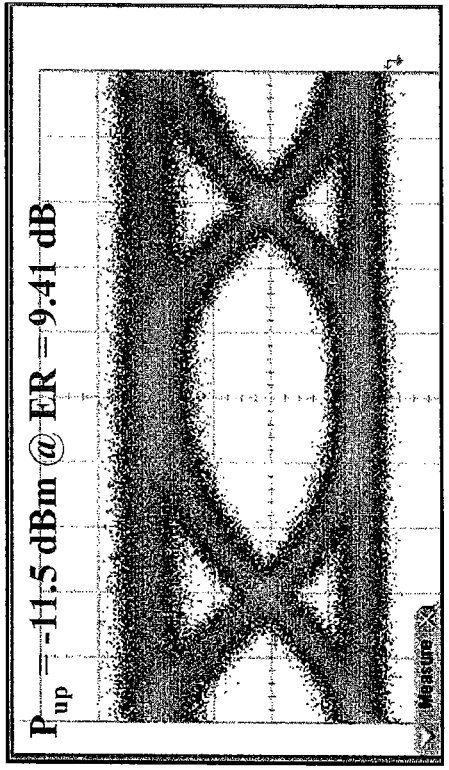
FIGS. 7A to 7D are eye diagrams of uplink input powers before equalization.
Figure 7D:
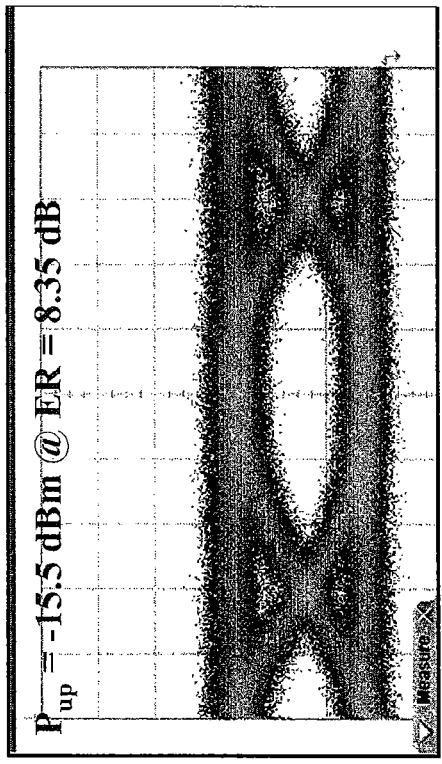
Figure 7A:
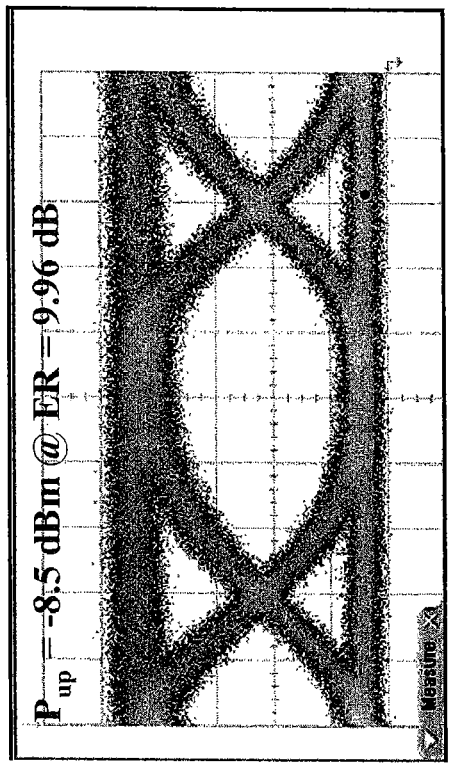
Figure 7C:
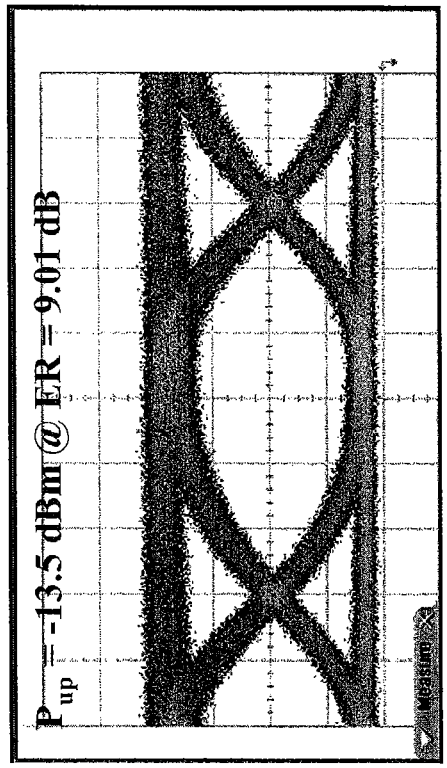
Figure 8B:
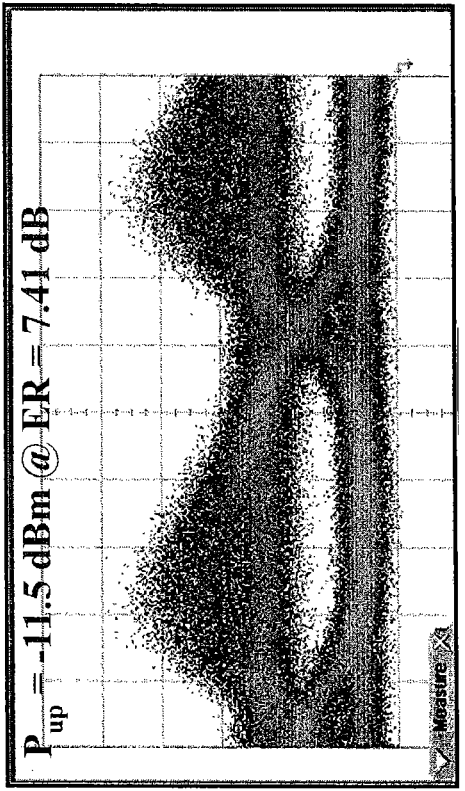
FIGS. 8A to 8D are eye diagrams of uplink input powers after equalization consistent with an example of the present invention.
Figure 8D:
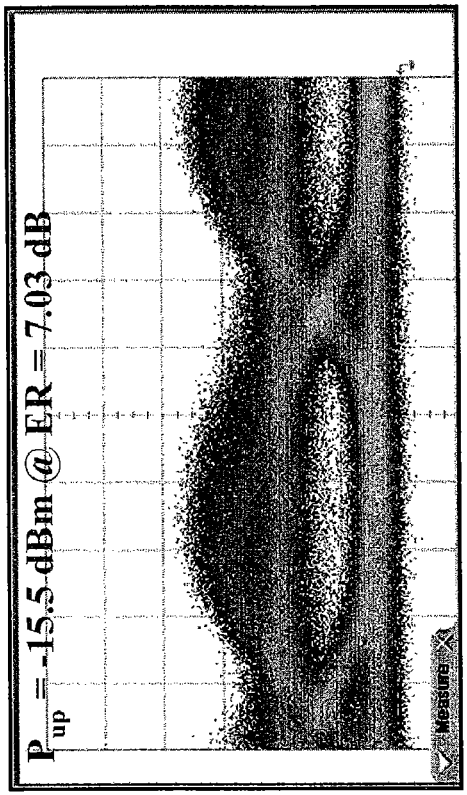
Figure 8A:
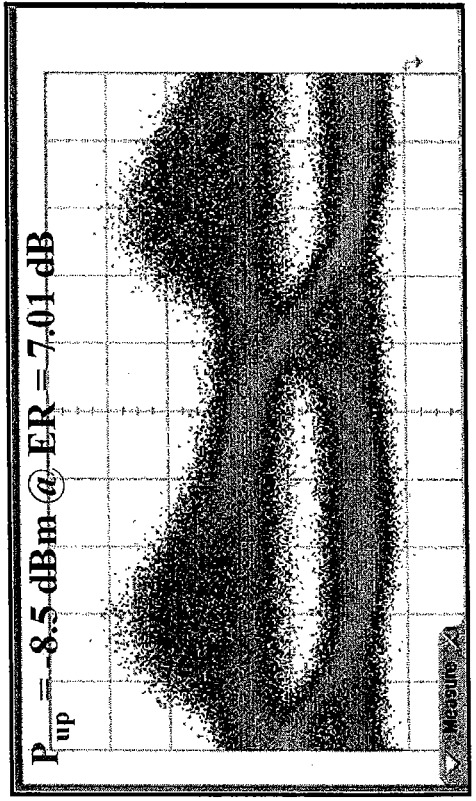
Figure 8C:
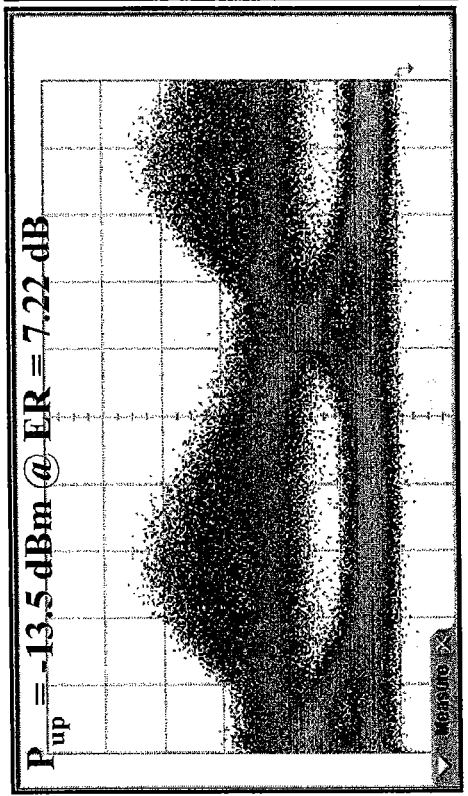

FIGS. 5A and 5B are characteristic diagrams of a Fabry-Perot laser diode ("FP-LD"). Although FP-LDs are generally used as transceivers in ONUs for transmitting 1310-nm uplink signals, for the purpose of convenience, 1510-nm FP-LDs are used in the experimental design. Skilled persons in the art will understand that FP-LDs have similar optical characteristics, despite the applications in different wavelengths. FIG. 5A illustrates the output power of an FP-LD as a function of bias current. The FP-LD is controlled at a temperature of approximately 22 degrees Celsius (° C.), and has a mode spacing of approximately 1.3 nm. Referring to FIG. 5A, it can be seen that the threshold current ($I_{THRES}$) of the FP-LD is approximately 9.5 milliampere (mA), at which the corresponding output power is approximately −10.1 dBm. When the bias current ($I_{BIAS}$) is 9 mA, the corresponding output power is approximately −13.6 dBm. The FP-LD enters an excited state as $I_{BIAS}$ exceeds $I_{THRES}$, and enters a saturation state as $I_{BIAS}$ exceeds approximately 20 mA.

FIG. 5B illustrates the total power of an FP-LD at different uplink input powers. With a bias current $I_{BIAS}$ of approximately 9 mA smaller than the $I_{THRES}$, the FP-LD does not but is ready to enter the excited state. Considering an insertion loss of approximately 14 dB and transmission loss over optical paths, the power level of an uplink optical signal that reaches an OLT may range from approximately −17 dBm to −25 dB. Furthermore, according to the standards for PON, the minimum power level available for an OLT is approximately −25 dBm. As a result, power levels between −15 and −25 dBm are of interest. Referring to FIG. 5B, for uplink input powers ranging from −15 to −25 dBm, the total output power of a mode-locked FP-LD ranges from approximately −14.9 to −15.1 dBm, resulting in an output power variation of approximately 0.2 dBm. Furthermore, for the same uplink input powers, the total output power of an FP-LD without mode-locked ranges from approximately −16.9 to −17.3 dBm, resulting in an output power variation of approximately 0.4 dBm. Accordingly, a mode-locked FP-LD has a better performance in equalization than an FP-LD without mode-locked.

FIGS. 6A to 6D are diagrams illustrating output spectrums at different input power levels. It can be seen from FIGS. 6A to 6D that the output powers corresponding to uplink input powers of −8.5, −11.5, −13.5 and −15.5 dBm are −14.1, −14.5, −14.7 and −14.9 dBm, respectively, given a mode-locked FP-LD. Accordingly, an OPE according to the present invention is able to equalize uplink optical signals having power levels ranging from −8.5 to −25 dBm with approximately 1 dBm power variation.

FIGS. 7A to 7D are eye diagrams of uplink input powers before equalization. In the experiment, phase modulation is conducted in an electro-optical modulator made of lithium niobate ($LiNbO_3$) in a 20 gigabits per second (Gbit/s) non-return to zero ("NRZ") system. Referring to FIGS. 7A to 7D, the measured extinction ratios ("ERs") of the uplink input powers of −8.5, −11.5, −13.5 and −15.5 dBm are 9.96, 9.41, 9.01 and 8.35 dB, respectively. It can be found that the ER decreases as the uplink input power decreases.

FIGS. 8A to 8D are eye diagrams of uplink input powers after equalization consistent with an example of the present invention. Referring to FIGS. 8A to 8D, the measured extinction ratios of the uplink input powers of −8.5, −11.5, −13.5 and −15.5 dBm are 7.01, 7.41, 7.22 and 7.03 dB, respectively, which are greater than 6 dB, a value required by the standards for PON. Furthermore, the eye openings are substantially the same in FIGS. 7A to 7D.

It will be appreciated by those skilled in the art that changes could be made to one or more of the examples described above without departing from the broad inventive concept thereof. It is understood, therefore, that this invention is not limited to the particular examples disclosed, but it is intended to cover modifications within the scope of the present invention as defined by the appended claims.

Further, in describing certain illustrative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A device configured to equalize optical powers of optical signals in a passive optical network, the device comprising:
a first optical coupler configured to receive optical signals having the same wavelength but different optical power levels;
an optical circulator configured to direct the optical signals from the first optical coupler;
a laser diode configured to receive an applied, bias current and generate equalized optical signals having a predetermined range of optical power levels in response to the optical signals directed from the optical circulator, the bias current being substantially fixed across the different optical power levels of the optical signals having the same wavelength; and
a second optical coupler configured to receive the equalized optical signals.

2. The device of claim 1, wherein the laser diode includes a Fabry-Perot laser diode.

3. The device of claim 1, wherein the laser diode is substantially the same as that used in an optical network unit in the passive optical network.

4. The device of claim 1, wherein each of the first and second optical couplers includes a wavelength division multiplexed coupler.

5. The device of claim 1, wherein the second optical coupler is connected to a multiplexer/demultiplexer of an optical line termination in the passive optical network.

6. A device configured to equalize optical powers of optical signals in a passive optical network, the device comprising:
a laser diode configured to receive an applied, bias current and generate equalized optical signals having a predetermined range of optical power levels in response to optical signals having the same first wavelength, the bias current being substantially fixed across different optical power levels of the optical signals having the same first wavelength; and
an optical circulator configured to direct the optical signals having a first wavelength to the laser diode and bypass optical signals having a second wavelength different from the first wavelength.

7. The device of claim 6, wherein the laser diode includes a Fabry-Perot laser diode.

8. The device of claim 6, wherein the laser diode is substantially the same as that used in an optical network unit in the passive optical network.

9. The device of claim 6, wherein the optical circulator includes a first port configured to receive the optical signals having the first wavelength, and a second port configured to receive the equalized optical signals.

10. The device of claim 7, wherein the optical circulator includes a third port connected to a multiplexer/demultiplexer of an optical line termination in the passive optical network.

11. A device configured to equalize optical powers of optical signals in a passive optical network, the device comprising:
a multiplexer/demultiplexer;
a laser diode configured to receive an applied, bias current and generate equalized optical signals having a predetermined range of optical power levels in response to optical signals having the same first wavelength from the multiplexer/demultiplexer, the bias current being substantially fixed across different optical power levels of the optical signals having the same first wavelength; and
an optical circulator configured to direct the optical signals having the first wavelength to the laser diode.

12. The device of claim 11, wherein the laser diode includes a Fabry-Perot laser diode.

13. The device of claim 11, wherein the laser diode is substantially the same as that used in an optical network unit in the passive optical network.

14. The device of claim 11, wherein the multiplexer/demultiplexer includes a wavelength division multiplexed coupler.

15. The device of claim 11, further comprising a photo detector configured to detect the equalized optical signals.

16. The device of claim 11, further comprising a light source configured to generate optical signals having a second wavelength different from the first wavelength.

17. The device of claim 11, wherein the optical circulator includes a first port connected to the multiplexer/demultiplexer, and a second port connected to the laser diode.

18. The device of claim 17, wherein the optical circulator includes a third port connected to a photo detector.

19. The device of claim 11, wherein the multiplexer/demultiplexer is configured to demultiplex the optical signals having the first wavelength.

20. The device of claim 16, wherein the multiplexer/demultiplexer is configured to multiplex the optical signals having the second wavelength.

21. The device of claim 1, wherein the applied bias current is fixed at a current approximately equal to or less than a threshold current of the laser diode.

22. The device of claim 6, wherein the applied bias current is fixed at a current approximately equal to or less than a threshold current of the laser diode.

23. The device of claim 11, wherein the applied bias current is fixed at a current approximately equal to or less than a threshold current of the laser diode.

* * * * *